UNITED STATES PATENT OFFICE.

DAVID H. BURRELL, OF LITTLE FALLS, NEW YORK.

MANUFACTURE OF CHEESE.

SPECIFICATION forming part of Letters Patent No. 319,882, dated June 9, 1885.

Application filed June 4, 1883. (No specimens.)

*To all whom it may concern:*

Be it known that I, DAVID H. BURRELL, a citizen of the United States, residing at Little Falls, in the county of Herkimer, and State of New York, have invented certain new and useful Improvements in the Manufacture of Cheese; and I do declare the following to be a full, clear, and exact description of the invention, such as will enable others skilled in the art to which it appertains to make and use the same.

This invention relates to an improvement in the manufacture of anti-huffing cheese from skim-milk and buttermilk, as hereinafter described.

Heretofore in all efforts that have been made to use buttermilk and skim-milk in the manufacture of cheese the difficulty has always been that the addition of buttermilk has produced a fermentation which has caused the cheese to huff up and split open and spoil. In order to overcome this difficulty, it has been necessary to use the skim-milk and buttermilk in a perfectly fresh and sweet condition, or else to employ an alkali, or an antiseptic, or suitable preservative material to prevent fermentation.

Prof. Arnold, in his Patent No. 187,798, provides for the use of sweet milk and sweet buttermilk, the product of milk heated up to 140°. It will be observed, however, that he did not propose to heat the buttermilk after its separation through churning. By heating the new milk before the animal heat had entirely left it the milk was somewhat purified, so that the putrefactive germs remaining in the buttermilk after churning the cream were not as active as in the ordinary buttermilk; but this buttermilk had to be used perfectly sweet, and even then the cheese was liable to huff and become spoiled because it was not easy to keep the cream perfectly sweet in hot weather while churning and getting it into buttermilk.

The Larrabee and Jocelyn Patent No. 162,667, describes a method of using an alkali and an antiseptic in connection with the employment of sour skim-milk and sour buttermilk, or either of them, in the manufacture of cheese. This plan, however, was not a success, because, owing to the different degrees of acidity which the buttermilk attains—the cream being sometimes allowed to set until it becomes only slightly acid, while in other cases it stands until the cream is so thick that a stick will stand up in it—the varying conditions of the buttermilk were so great that sometimes too much of the alkali was put in, and sometimes not enough, and the result was cheese that were not uniform, some huffing and some being eaten by the alkali so that they had a taste of soap.

Experience has shown that the best butter is made by allowing the cream to become acid before churning. Therefore, there is no sweet buttermilk available in the best creameries, and, as a consequence, sour buttermilk, for the reasons before stated, has been allowed to go to waste. It is a well-conceded fact that each ten pounds of buttermilk contains from one to one and a quarter pounds of curd, which will add to the yield of skim-cheese, as well as improve its quality if properly used. The difficulty has been that the ferments contained in this buttermilk have caused the cheese to huff and decay.

I have found that by heating the buttermilk as soon as it comes from the churn to a point high enough to absolutely kill all the ferments or germs which exist in buttermilk, whether a fungous growth, or whatsoever they may be, and then adding this buttermilk to the skim-milk, a cheese can be made that will not huff. I have also found that the increased yield over the use of buttermilk that was not heated is quite marked, and that the quality of the cheese is vastly improved in every way.

In carrying my invention into effect I use the buttermilk fresh from the churn, either sweet or sour, and heat it to a point approximately 200°, high enough to kill the ferments or germs contained therein, or, in other words, to destroy that substance or principle in buttermilk which causes cheese to huff. This buttermilk is immediately added to the skim-milk, which may be either sweet or sour, heated or cold. I then allow the mixture of skim-milk and buttermilk to cool to a point at which rennet may be safely added. Then coagulate the mass and cut the curd, and proceed in the usual manner of manufacturing cheese from skim-milk alone.

As the best butter is made by allowing the cream to become acid before churning, I prefer to let the cream stand about twenty-four hours after skimming. During this interval all or the greater part of the germs of ferment will become developed to such a degree that the heating of the sour buttermilk after it is taken from the churn will result in preventing all further tendency to fermentation.

By this process of making cheese from skim-milk and buttermilk, the said materials may be either sweet or sour, as the heating of the buttermilk to 200°, or thereabout, effectually destroys its contained ferments and obviates all liability of producing a huffing cheese. The addition of the heated buttermilk to the skim-milk also adds considerably to the quantity of cheese, besides improving its quality, which results from the fact that the albumen, as well as the caseine of the heated buttermilk, as described in my application filed April 25, 1883, is thickened and thereby retained in the cheese, instead of running off in the whey as is usual.

This manner of making cheese from skim-milk and buttermilk not only permits the use of the materials in either a sweet or sour condition, but renders it possible to dispense with alkalies and antiseptics.

I am aware that a buttermilk curd has been prepared by first heating the buttermilk so as to precipitate the curd and then adding warm water to the curd for the purpose of washing out the lactic acid, as described in the patent to William Cooley, No. 241,788, dated May 24, 1881; but I am not aware that buttermilk, either sweet or sour, has been heated, after its separation, as I propose, to a degree sufficient to destroy its germs of ferment.

Having thus described my invention, what I claim as new, and desire to secure by Letters Patent, is—

The method of making an anti-huffing cheese from skim-milk and buttermilk, without the use of an alkali or an antiseptic, which consists in heating the buttermilk sufficiently to destroy the ferments or germs contained therein, then adding this buttermilk to the skim-milk, then coagulating the mass, and proceeding in the usual manner, substantially as described.

In testimony whereof I affix my signature in presence of two witnesses.

DAVID H. BURRELL.

Witnesses:
   T. H. MIDDLETON,
   H. BUCHANAN.